United States Patent
Al-Zaid et al.

(10) Patent No.: US 9,623,451 B2
(45) Date of Patent: Apr. 18, 2017

(54) EAFD STABILIZER FOR RETURNED CONCRETE AND MIXER DRUM WASH WATER

(75) Inventors: Rajeh Zaid Al-Zaid, Riyadh (SA); Abdulaziz Ibrahim Al-Negheimish, Riyadh (SA); Abdulrahman Mohammed Alhozaimy, Riyadh (SA); Mohammad Iqbal Khan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 360 days.

(21) Appl. No.: 13/219,586

(22) Filed: Aug. 26, 2011

(65) Prior Publication Data

US 2012/0049399 A1 Mar. 1, 2012

(51) Int. Cl.
| | |
|---|---|
| C04B 18/14 | (2006.01) |
| C04B 40/06 | (2006.01) |
| B08B 3/14 | (2006.01) |
| B09B 3/00 | (2006.01) |
| C04B 22/00 | (2006.01) |
| C04B 40/00 | (2006.01) |

(52) U.S. Cl.
CPC .............. *B08B 3/14* (2013.01); *B09B 3/0041* (2013.01); *C04B 22/0046* (2013.01); *C04B 40/0039* (2013.01); *C04B 40/06* (2013.01); *Y02W 10/00* (2015.05); *Y02W 30/94* (2015.05)

(58) Field of Classification Search
CPC ............................. C04B 18/149; C04B 40/06
USPC ....................................................... 264/333
See application file for complete search history.

(56) References Cited

U.S. PATENT DOCUMENTS

| | | | |
|---|---|---|---|
| 5,245,122 A * | 9/1993 | Smith | 588/257 |
| 5,557,031 A | 9/1996 | Al-Sugair et al. | |
| 5,569,152 A | 10/1996 | Smith | |
| 5,814,253 A * | 9/1998 | Sikaffy et al. | 264/42 |
| 5,853,474 A | 12/1998 | Hilton | |
| 5,860,268 A * | 1/1999 | McWilliams | 52/784.11 |
| 6,685,771 B2 | 2/2004 | Long et al. | |
| 2006/0012086 A1* | 1/2006 | Munch-Laursen et al. | 264/601 |

FOREIGN PATENT DOCUMENTS

| | | |
|---|---|---|
| KR | 20040039079 A | 5/2004 |
| WO | WO 2010/074811 A1 * | 7/2010 |

OTHER PUBLICATIONS

Jeff Borger et al. Use of Recycled Wash Water and Returned Plastic Concrete in the Production of Fresh Concrete, Advanced Cement Based Materials, Nov. 1994, vol. 1, Issue 6, pp. 267-274.*

(Continued)

*Primary Examiner* — Matthew Daniels
*Assistant Examiner* — Patrick Butler
(74) *Attorney, Agent, or Firm* — Richard C. Litman (57) ABSTRACT

The EAFD stabilizer for returned concrete and mixer drum wash water includes various methods of using EAFD as a stabilizer in making concrete. The potentially hazardous stockpile of EAFD can be used in practical construction, which has a positive impact on the environment. A certain amount of EAFD is added to cement being mixed or to wash water and acts as a stabilizer, the wash water being used to make a cement mixture. This resultant EAFD stabilized concrete mixture stabilizes overnight.

2 Claims, 10 Drawing Sheets

(56) References Cited

OTHER PUBLICATIONS

"ASTM Standard C192/C192M-07: Standard Practice for Making and Curing Concrete Test Specimens in the Laboratory" [online], 2007, ASTM International, West Conshohocken, PA, 2009 [retrieved on Jan. 12, 2016]. Retrieved from the Internet: <URL: http://www.astm.org> pp. 1-8 <DOI:10.1520/C0192_C0192M-07>.*

S. Abdol Chini and William J. Mbwambo, "Environmentally Friendly Solutions for the Disposal of Concrete Wash Water from Ready Mixed Concrete Operations", CIB W89 Beijing International Conference, Oct. 21-24, 1996.

Alexandre S. de Vargas, Ângela B. Masuero, and Antônio C.F. Vilela, "Investigations on the use of electric-arc furnace dust (EAFD) in Pozzolan-modified Portland cement I (MP) pastes", Cement and Concrete Research, vol. 36, Issue 10, Oct. 2006, pp. 1833-1841.

* cited by examiner

EAFD STABILIZER FOR RETURNED CONCRETE AND MIXER DRUM WASH WATER

BACKGROUND OF THE INVENTION

1. Field of the Invention

The present invention relates to construction materials, and particularly to an EAFD stabilizer for returned concrete and mixer drum wash water that uses Electric Arc Furnace Dust as a stabilizer, both as a stabilizer in concrete preparation, and also as a stabilizer for water used to wash out concrete drums, thereby providing an environmentally safe means of disposal for EAFD, which is a hazardous material, and recycling corrosive water that would otherwise be considered a hazardous material requiring containment on-site and disposal as a hazardous waste.

2. Description of the Related Art

Electric-Arc Furnace Dust (EAFD) is a waste by-product material generated during the steel manufacturing process at a rate of about 2% of the total steel output. The chemical composition of EAFD has been investigated by several researchers, and the most abundant heavy metals in EAFD were found to he Zinc (Zn), Lead (Pb), Chromium (Cr), and Cadmium (Cd). However, due to the leaching potential of the heavy metals contained therein, EAFD has been designated by the European Union (EU), and the EPA (United States Environmental Protection Agency) as a hazardous waste, which requires that EAFD must be treated prior to proper disposal in landfills. Therefore, finding effective and safe methods to discard large quantities of EAFD produced by the steel industry is a major environmental concern.

One possible solution has been to use EAFD to produce concrete. However, EAFD concrete could not be practically produced due primarily to the prolonged setting times of EAFD concrete. Such prolonged setting times can negatively impact the time and financial resources of a given construction project.

In the ready-mix concrete industry, it is a common practice to thoroughly clean the inside of a concrete truck's mixer drum at the end of each day. This may require 150 to 300 gallons of water. This wash water has a high pH and contains caustic soda and potash. Regulations require that concrete producers contain the mixer drum wash water on-site, and dispose of the water as hazardous material, unless the water is stabilized by chemical treatment.

In light of the above, it would be a benefit in the construction arts to provide a means of using EAFD in an economically practical manner that substantially reduces the environmental impact of EAFD stock, and to provide a way to stabilize mixer drum wash water to permit re-use of the water without harm to the environment. Thus, an EAFD stabilizer for returned concrete and mixer drum wash water solving the aforementioned problems is desired.

SUMMARY OF THE INVENTION

The EAFD stabilizer for returned concrete and mixer drum wash water includes various methods of using EAFD as a stabilizer in making concrete. The potentially hazardous stockpile of EAFD can be used in practical construction, which has a positive impact on the environment. A certain amount of EAFD is added to cement being mixed or to wash water and acts as a stabilizer, the wash water being used to make a cement mixture. This resultant EAFD stabilized concrete mixture stabilizes overnight.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
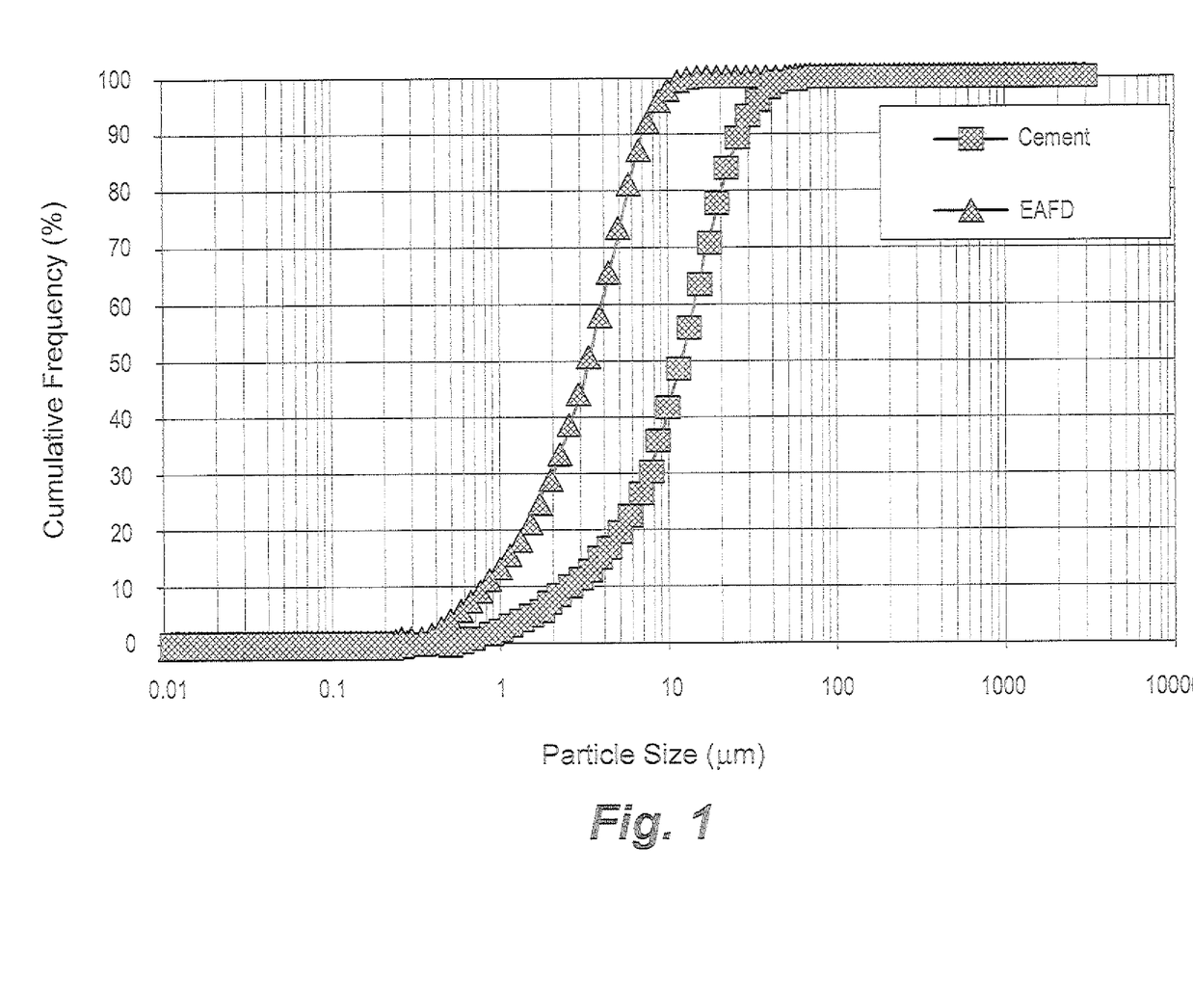
FIG. 1 is a chart showing the grain size distribution of EAFD and cement in an EAFD stabilizer for returned concrete according to the present invention.

The EAFD stabilizer for returned concrete and mixer drum wash water provides a viable and environmentally friendly use for EAFD. EAFD contains many products, as exemplarily shown in Table 1 (which shows a 2009 shipment from the HADEED Factory in Al-Jubail), including the heavy metals mentioned above. It has been found that EAFD has the potential to produce concrete with improved mechanical and durability performance. Some of that may be attributed to the relatively larger particle size of EAFD compared to typical cement, as exemplarily shown in FIG. 1. However, in order to determine acceptable levels of stabilization time, several mixtures containing different amounts of EAFD were formulated. In one non-limiting exemplary embodiment, the results suggested that adding 3% EAFD (by weight of cement) provides a stabilization time in the range of 22 to 26 hours, which is suitable for overnight stabilization of fresh concrete. Amounts of EAFD in the range between 1 kg and 2 kg per 100 liter of wash water were found to be sufficient for overnight stabilization of wash water without affecting the properties of concrete produced using the stabilized wash water.

TABLE 1

Typical Composition of EAFD

| | Analysis, % by Weight | | |
|---|---|---|---|
| | Sample 1 | Sample 2 | Average |
| Aluminum (Al) | 0.07 | 0.07 | 0.07 |
| Calcium (Ca) | 4.59 | 4.60 | 4.60 |
| Chlorine (Cl) | 1.01 | 1.04 | 1.03 |
| Chromium (Cr) | 0.09 | 0.11 | 0.10 |
| Copper (Cu) | 0.13 | 0.12 | 0.13 |
| Iron (Fe) | 39.58 | 39.61 | 39.60 |
| Potassium (K) | 5.31 | 5.32 | 5.32 |
| Magnesium (Mg) | 1.26 | 1.28 | 1.27 |
| Manganese (Mn) | 1.67 | 1.68 | 1.68 |
| Sodium (Na) | 0.29 | 0.12 | 0.21 |
| Nickel (Ni) | 0.01 | 0.02 | 0.02 |
| Phosphorus (P) | 0.21 | 0.21 | 0.21 |
| Lead (Pb) | 1.00 | 1.01 | 1.01 |
| Sulfur (S) | 0.25 | 0.26 | 0.26 |
| Silicon (Si) | 0.71 | 0.72 | 0.72 |
| Titanium (Ti) | 0.07 | 0.08 | 0.08 |
| Vanadium (V) | 0.16 | 0.16 | 0.16 |
| Zinc (Zn) | 16.72 | 16.73 | 16.73 |

Tests were conducted to determine the fresh and short-term hardened properties of the stabilized concrete and the concrete produced using stabilized wash water. The tests conducted on fresh concrete included slump, slump retention and setting time. The compressive strength tests at 7 days, 28 days and 90 days were conducted on the hardened concrete.

EAFD stabilized concrete and concrete prepared using EAFD stabilized wash water were found to perform better than the control mixes in regards to slump retention. These mixes developed the same compressive strength as the control. For the overnight stabilized concrete, there was a reduction in the slump at the end of the stabilization period. In general, at least for the overall short-term performance, EAFD has proven to be a viable means for overnight stabilization for both concrete and wash water. The following example describes the method of producing concrete using the EAFD stabilizer and the testing performed thereon.

EXAMPLE

Concrete ingredients were mixed according to standard ASTM C-192 "Standard Method of Making and Curing Concrete Test Specimens in the Laboratory." The water-binder ratio of 0.52 by weight and temperatures at 20±2° C. was maintained throughout. Initially, aggregates were added into the mixer together with absorption water. After a few revolutions of the mixer, the cement and the remaining mixing water were added. The mixer was run for about 3 minutes after all the ingredients were added, then left to rest for 3 minutes. Finally, the mixer was run for another 2 minutes.

To simulate the case of using EAFD as a stabilizer for concrete, the specified amount of EAFD was spread out over the concrete mixture, and the amount of water necessary to adjust the water-binder ratio was then added to the mixer. In the non-limiting exemplary embodiment, the amount of EAFD used was about 3% by weight of cement. The mixer was run for other 5 minutes. The fresh concrete was then discharged into wheel barrows just after mixing and stored while covered with plastic sheets. Before being cast and tested, the stabilized fresh concrete was placed back into the mixer and mixed for another 2 minutes.

To simulate the case of using EAFD as a stabilizer for mixer drum wash water, a small scale concrete mixture was made and used to prepare the control test samples. The mixer was then cleaned using water. Part of the wash water was discharged from the mixer into a plastic bag to be used as a reference, and the remaining was discharged into a plastic container to determine the volume by weight of wash water to be stabilized. This part of wash water was then returned back into the mixer and the required amount of EAFD was added. In the non-limiting exemplary embodiment, the amount of EAFD used was about 1 kg/100 liter of water. The mixer was run for 2 minutes. The wash water containing EAFD was again discharged into a plastic container and remained in a slurry form until the next day. The stabilized wash water was then used to prepare a concrete mixture. In summary, the method described above can be seen as the following steps:

A method of recycling Electric Arc Furnace Dust (EAFD) as a stabilizer for mixer drum wash water, comprising the steps of:
    placing a premeasured volume of mixer drum wash water into a mixer;
    adding EAFD to the mixer at a rate of between 1 kg and 2 kg of EAFD per 100 liter of the mixer drum wash water;
    mixing the EAFD and the mixer drum wash water for about 2 minutes;
    allowing the EAFD and the mixer drum wash water to stabilize for a period between about 22 hours and 26 hours; and
    using the EAFD stabilized mixer drum wash water to prepare concrete;
    wherein the step of using the EAFD stabilized mixer drum wash water to prepare concrete comprises the steps of:
    placing a premeasured amount of aggregate into a mixer;
    mixing EAFD stabilized mixer drum wash water with the aggregate;
    adding cement and sufficient EAFD stabilized mixer drum wash water to form a water-binder ratio of 0.52 to the mixer;
    mixing the EAFD stabilized mixer drum wash water, aggregate, and cement for about 5 minutes; and
    casting the stabilized mixture.

After preparation of concrete mixtures, the following tests were performed.

(1) Initial slump test. The test was performed based on ASTM C-143 "Standard Test Method for Slump of Portland Cement Concrete." Besides the initial slump, slump tests were done at 30 minutes intervals to investigate the capability of the concrete mixtures to retain the slump.

(2) Setting time test. The test was performed according to ASTM C-403 "The Standard Test Method for Time of Setting of Concrete Mixtures by Penetration Resistance." Three specimens were prepared and tested using an automatic vicat needle apparatus "ToniSet."

(3) Temperature variation within the fresh concrete. One 150×150×150 mm cube was prepared and a thermocouple was used to measure the temperature within the fresh concrete specimen until the full setting was reached. (4) Compressive strength. The compressive strength tests were performed according to ASTM C-39. The tests were conducted at 7, 28, and 90 days on 150 mm diameter and 300 mm height cylinders. Three cylinders were tested at each time interval.

Figure 2:
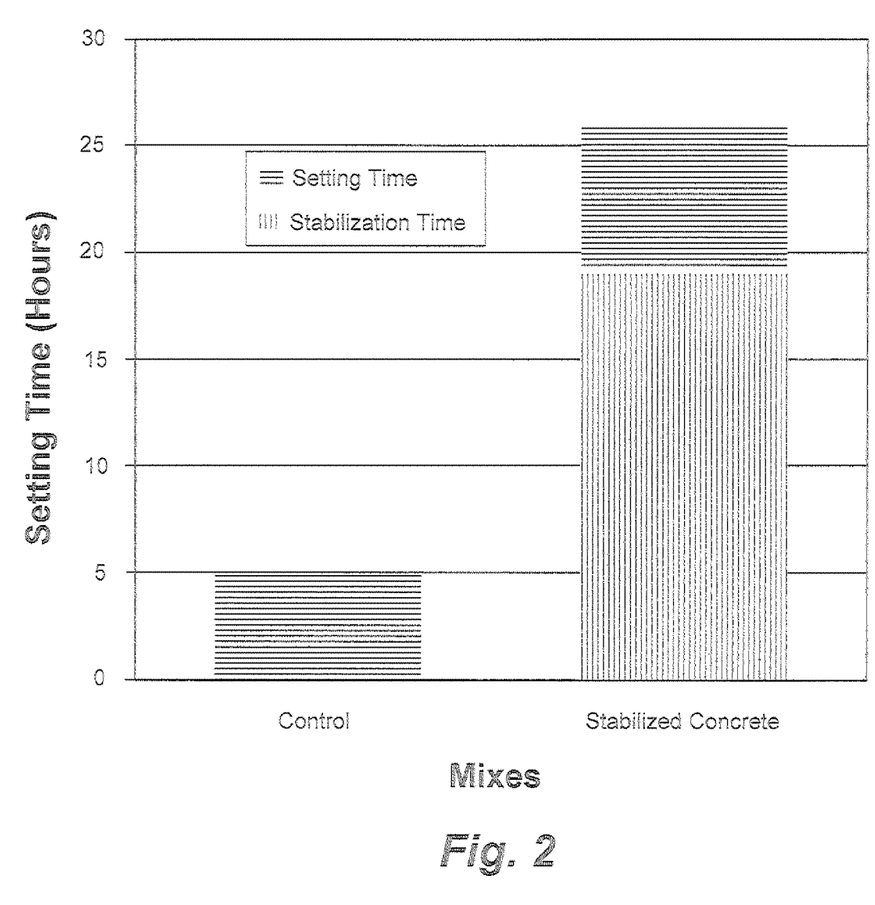
FIG. 2 is a chart showing the performance comparison between a control concrete and concrete using an EAFD stabilizer for returned concrete according to the present invention.
Figure 3:
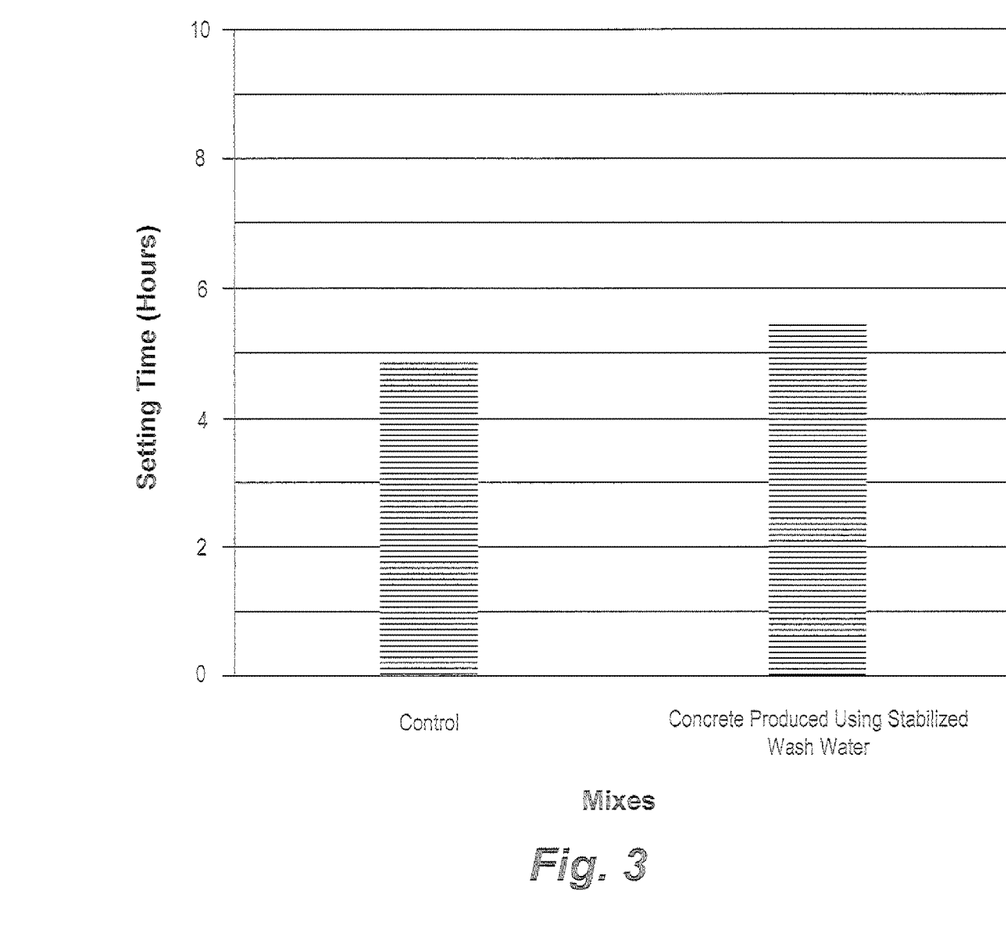
FIG. 3 is a chart showing the performance comparison between a control concrete and concrete using EAFD stabilized wash water according to the present invention.
Figure 4:
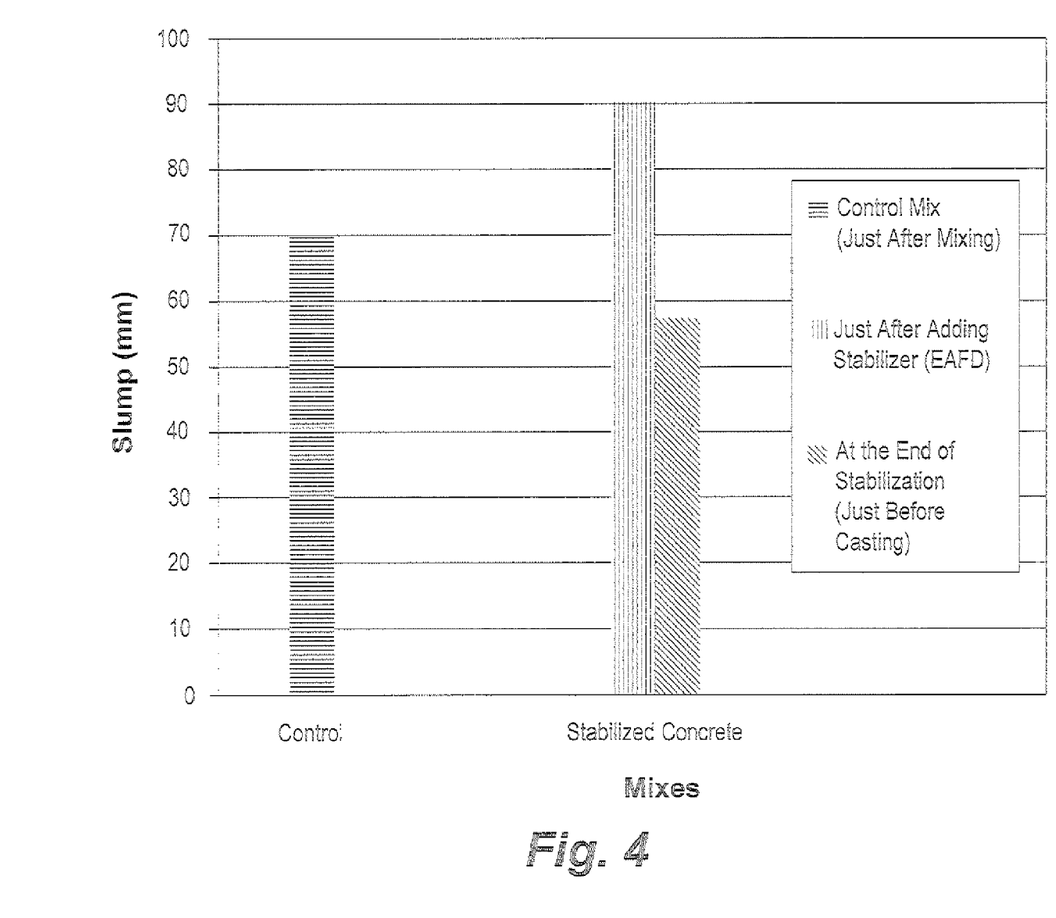
FIG. 4 is a chart showing a slump performance comparison between the control concrete and concrete using the EAFD stabilizer of FIG. 2.
Figure 5:
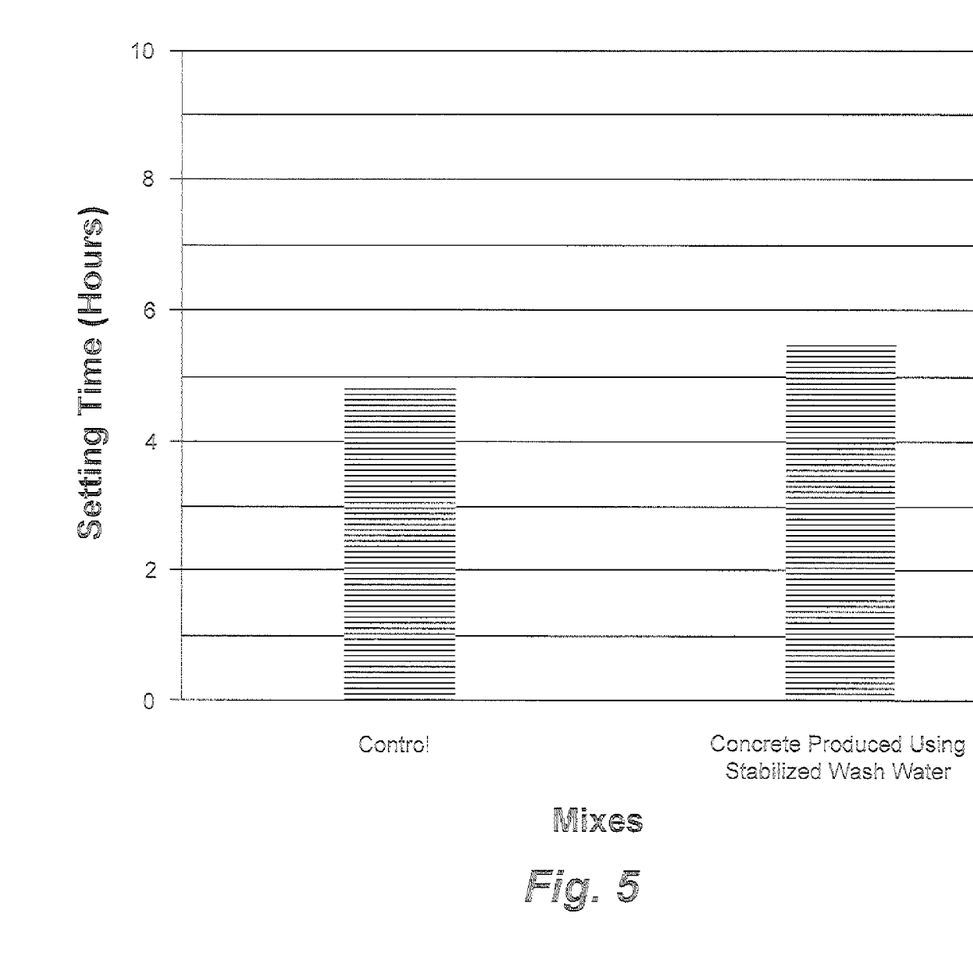
FIG. 5 is a chart showing a slump performance comparison between the control concrete and concrete using the EAFD stabilized wash water of FIG. 3.
Figure 6:
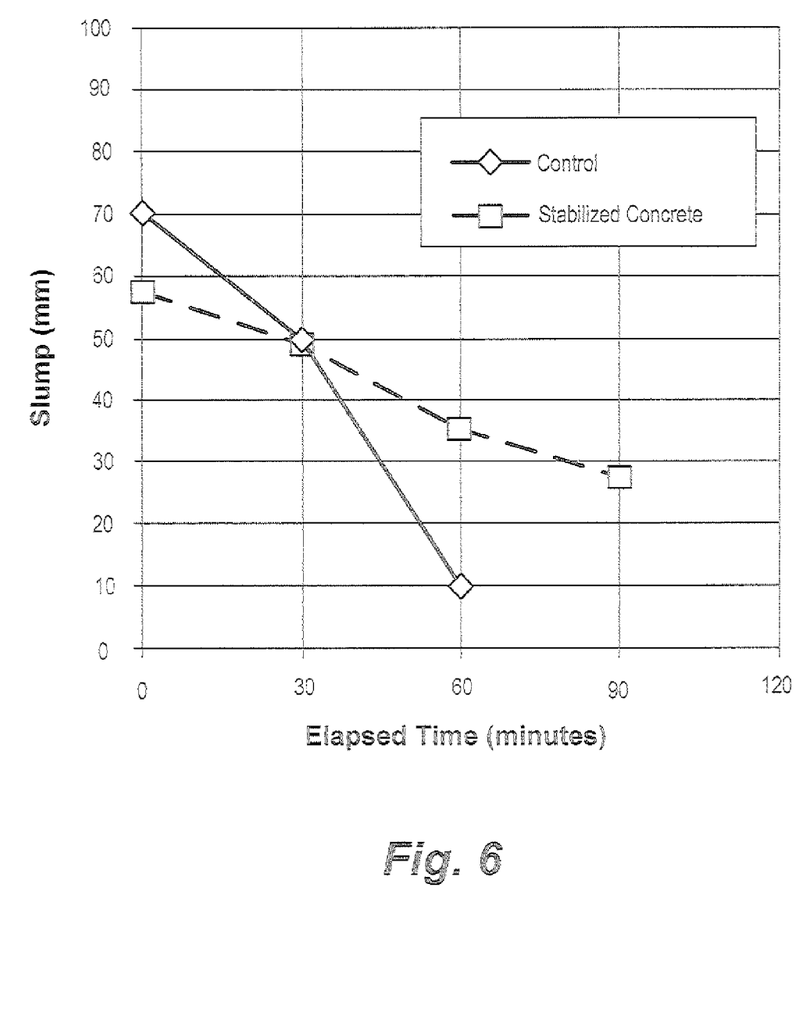
FIG. 6 is a chart showing a slump retention performance comparison between the control concrete and concrete using the EAFD stabilizer of FIG. 2.
Figure 7:
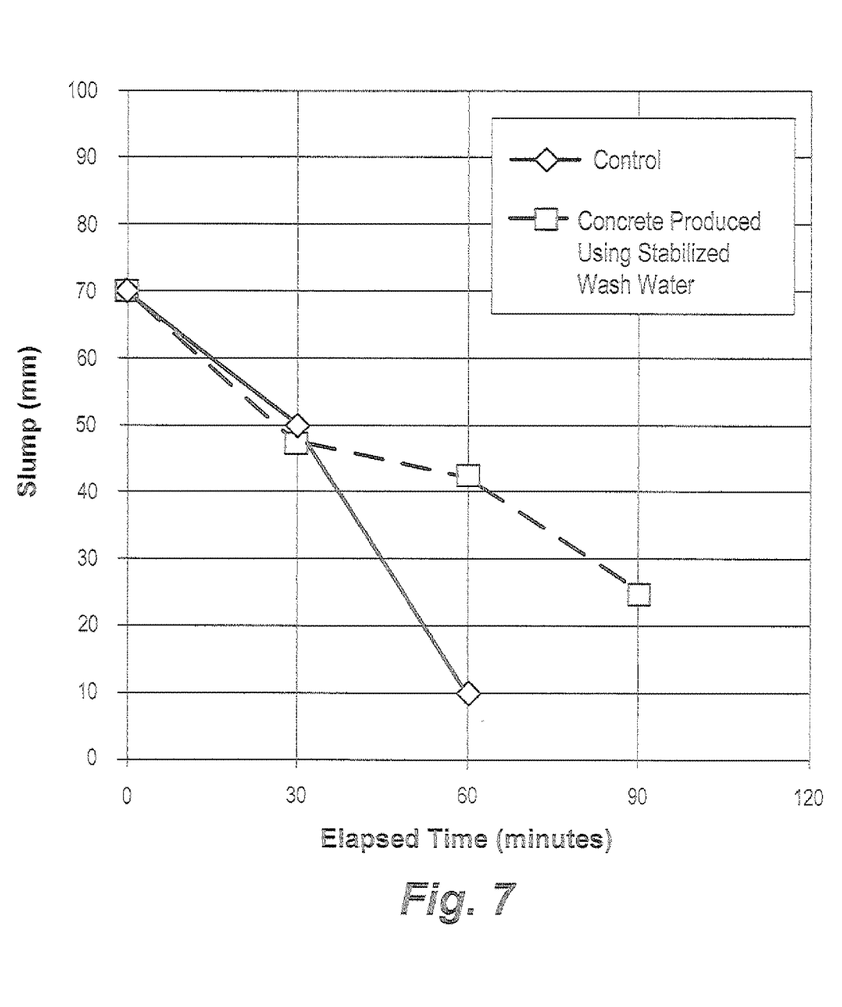
FIG. 7 is a chart showing a slump retention performance comparison between the control concrete and concrete using EAFD stabilized wash water of FIG. 3
Figure 8:
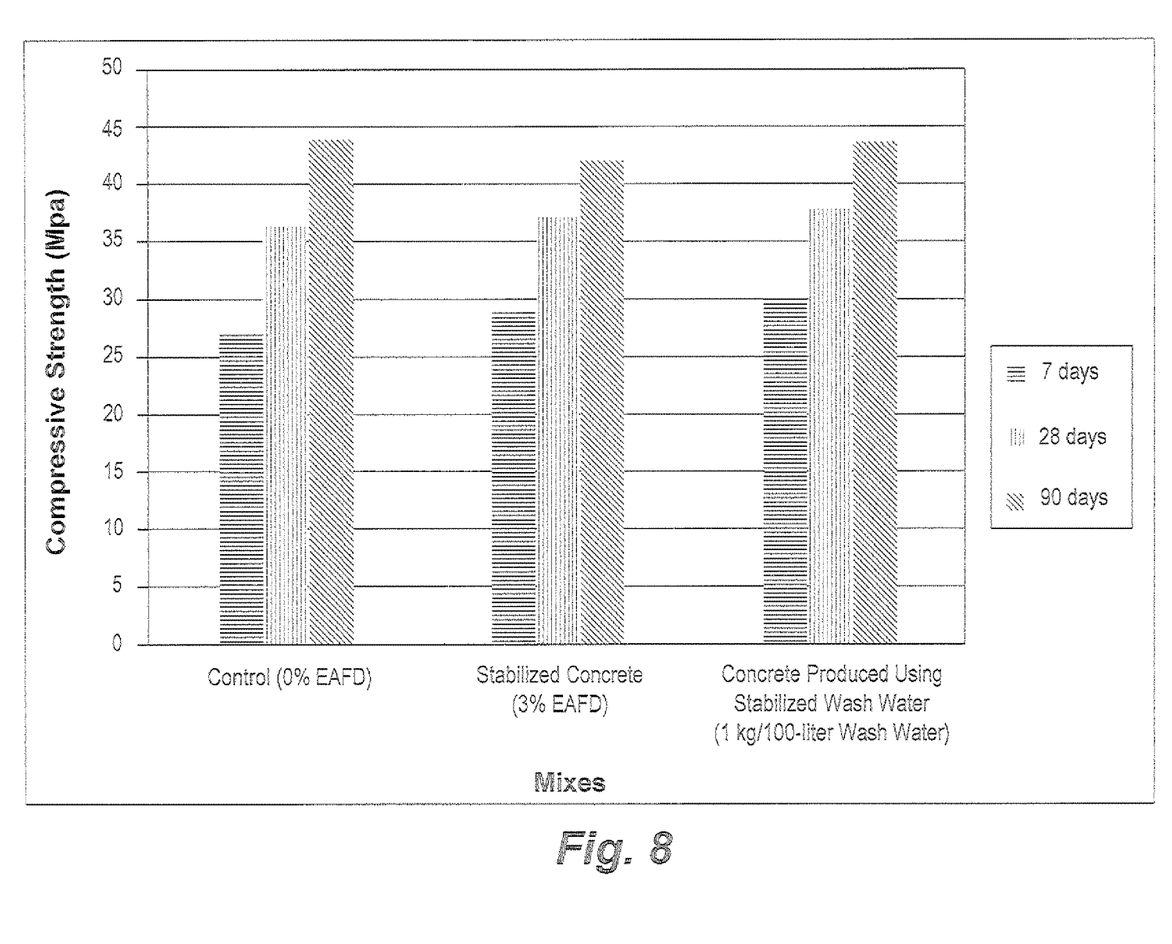
FIG. 8 is a chart showing a compressive strength performance comparison between the control concrete, stabilized concrete using EAFD and concrete using EAFD stabilized wash water according to the present invention.
Figure 9:
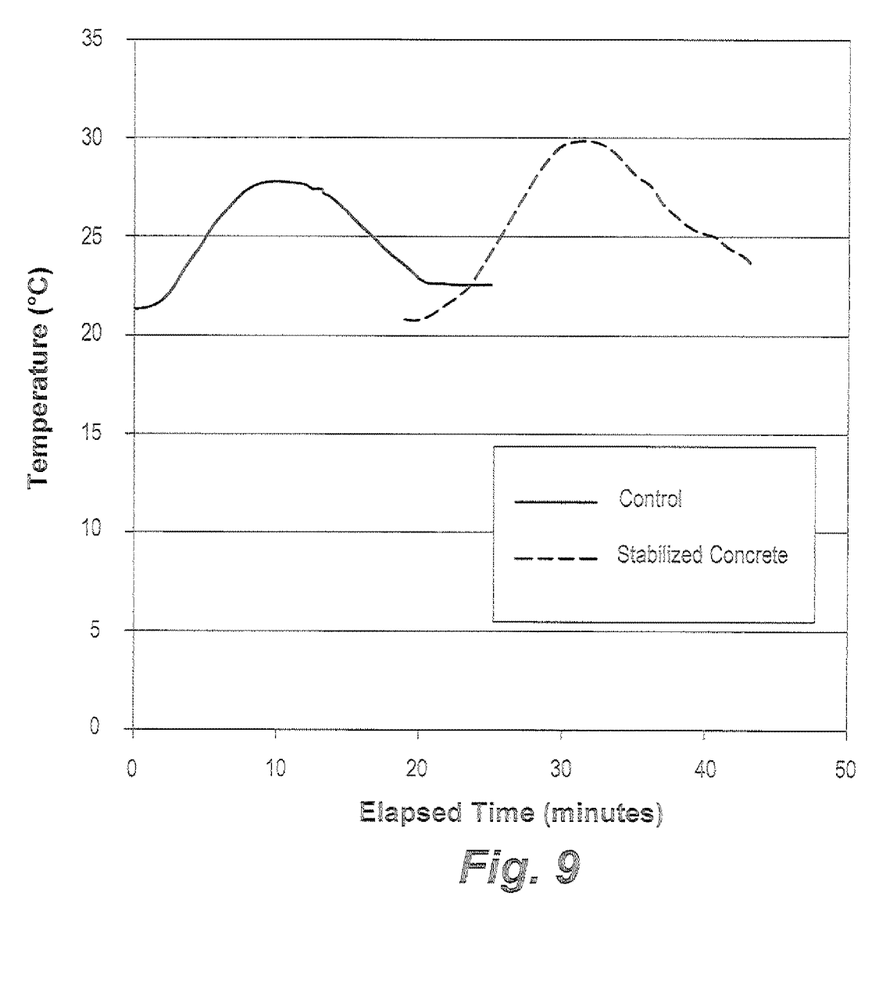
FIG. 9 is a chart showing the temperature variation between the control concrete and the EAFD stabilized concrete according to the present invention.
Figure 10:
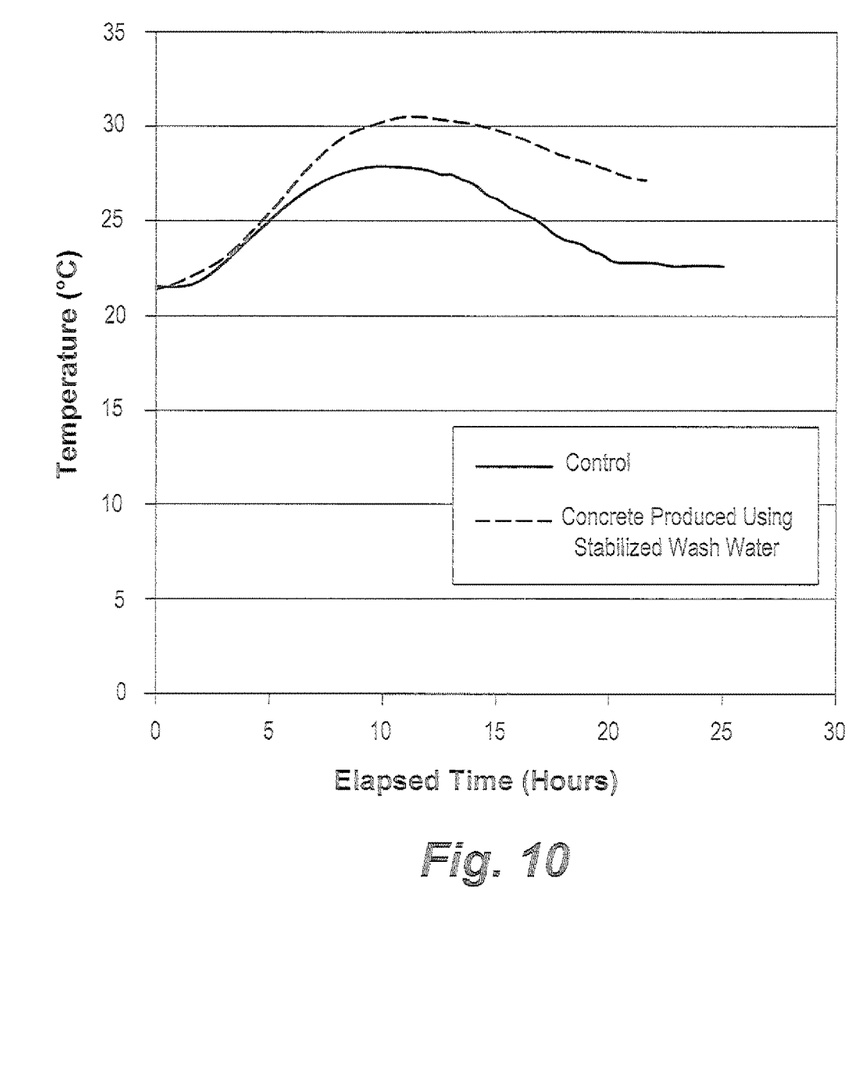
FIG. 10 is a chart showing the temperature variation between the control concrete and the concrete using EAFD stabilized wash water according to the present invention.

As shown in FIGS. 2 and 3, EAFD has been found to be a viable overnight stabilizer. The concrete using the EAFD stabilizer stabilized and set within approximately a 24 hour period while the concrete made with EAFD stabilized wash water set within a couple of hours longer compared to the control. The results shown in FIGS. 4-7 highlight that the EAFD stabilized concrete and the concrete made with EAFD stabilized wash water exhibit better slump and slump retention than the respective control concrete. Generally, higher temperatures existed in both types of concrete utilizing EAFD compared to the control as shown in FIGS. 9 and 10, which was expected due to the endothermic reactions resulting from introducing EAFD into the mix. In compression strength, both types of concrete using EAFD developed similar strength characteristics as their respective control concrete as shown in FIG. 8.

It is to be understood that the present invention is not limited to the embodiments described above, but encompasses any and all embodiments within the scope of the following claims.

We claim:

1. A method recycling Electric Arc Furnace Dust (EAFD) as stabilized concrete, comprising the steps of:
    placing a premeasured amount of aggregate into a mixer;
    mixing absorption water with the aggregate;
    adding cement and sufficient water to form a water-binder ratio of 0.52 by weight to the mixer;
    adding 3% EAFD by weight of the cement and sufficient water to the mixer to maintain the water-binder ratio of 0.52;
    mixing the EAFD stabilizer, water, aggregate, and cement for about 5 minutes;
    allowing the EAFD and cement to stabilize for a period between about 22 hours to about 26 hours to stabilize the mixture; and
    casting the stabilized mixture.

2. The method of recycling Electric Arc Furnace Dust (EAFD) as stabilized concrete of claim 1, further comprising the step of maintaining a temperature of about 20° C.

* * * * *